Patented Feb. 27, 1934

1,949,202

UNITED STATES PATENT OFFICE 1,949,202

PROCESS OF PREPARING 1.4.5.8-NAPHTHALENE-TETRA-CARBOXYLIC ACID AND SUBSTITUTION PRODUCTS THEREOF

Heinrich Greune and Wilhelm Eckert, Frankfort-on-the-Main-Hochst, Germany, assignors to General Aniline Works, Inc., New York, N. Y., a corporation of Delaware No Drawing. Application September 15, 1930, Serial No. 482,154. In Germany September 26, 1929

6 Claims. (Cl. 260—108)

The present invention relates to a process of preparing 1.4.5.8-naphthalene-tetra-carboxylic acid and substitution products thereof.

We have found that 1.4.5.8-naphthalene-tetra-carboxylic acid di-imide, derivatives or substitution products thereof, are transformed into the corresponding 1.4.5.8-naphthalene-tetra-carboxylic acid or its anhydride by treating them with concentrated sulfuric acid at an elevated temperature, preferably from about 160° C. to about 270° C. In view of the transformation of perylene-tetra-carboxylic acid di-imide into perylene-tetra-carboxylic acid by means of cencentrated sulfuric acid at a temperature of from 180° C. to 240° C. according to U. S. Patent No. 1,506,545, the present reaction is surprising inasmuch as according to the statements of "Bamberger und Philip" (Annalen der Chemie, volume 240, page 187) 1.4.5.8-naphthalene-tetra-carboxylic acid decomposes with splitting off of carbonic acid when rapidly heated to an appropriately high temperature. It is however surprising that the formation of 1.4.5.8-naphthalene-tetra-carboxylic acid, derivatives or substitution products thereof, from the corresponding di-imides occurs with a good yield and is adapted for the preparation of said acids on an industrial scale. In most cases 1.4.5.8-naphthalene-tetra-carboxylic acid is obtainable in the form of its anhydride.

In order to carry out the new reaction we preferably use surfuric acid of a higher concentration; fuming sulfuric acid however may also be used.

The following examples illustrate the invention, but they are not intended to limit it thereto, the parts being by weight:

(1) 10 parts of 1.4.5.8-naphthalene-tetra-carboxylic acid di-imide of the following formula:

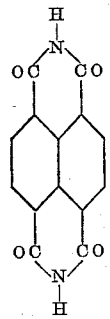

are heated together with 100 parts of concentrated sulfuric acid for some time up to a temperature of from 200° C. to 210° C. The solution is then allowed to cool, poured into water and after standing for some time the 1.4.5.8-naphthalene-tetra-carboxylic acid is filtered by suction in the form of its anhydride with good yield. The 1.4.5.8-naphthalene-tetra-carboxylic acid has the same properties as the acid described by "Bamberger und Philip" in Annalen der Chemie, vol. 240, page 182 et seq. It represents a valuable starting material for the preparation of dyestuffs.

(2) 10 parts of 1.4.5.8-naphthalene-tetra-carboxylic acid diphenyl di-imide of the following formula:

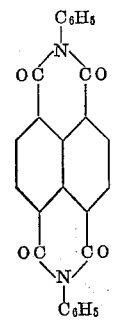

are heated together with 100 parts of sulfuric acid of 66° Bé. for some time to about 180° C. After cooling, the solution is poured into water and the 1.4.5.8-naphthalene-tetra-carboxylic acid precipitated thereby in the form of its anhydride is filtered with suction.

(3) 10 parts of 1.4.5.8-naphthalene-tetra-carboxylic acid dimethyl di-imide of the following formula:

are heated together with 100 parts of sulfuric acid monohydrate for a short time to a temperature of about 200° C. After cooling and pouring the solution into water, 1.4.5.8-naphthalene-tetra-carboxylic acid is precipitated as a weakly yellow substance.

(4) 10 parts of 2-chloro-1.4.5.8-naphthalene-tetra-carboxylic acid di-imide of the following formula:

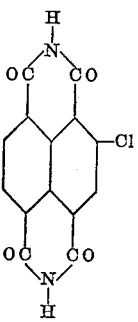

are heated together with 100 parts of oleum of 5 per cent strength for some time to a temperature of from 180° C. to 200° C. The solution is then allowed to cool, poured into water and after standing for some time the 2-chloro-1.4.5.8-naphthalene-tetra-carboxylic acid thus precipitated with good yield in the form of its anhydride is filtered with suction. The 2-chloro-1.4.5.8-naphthalene-tetra-carboxylic acid is identical with that obtainable according to Example 4 of the copending U. S. P. application Serial No. 478,312 filed August 27, 1930, for "A process of preparing 1.4.5.8-naphthalene-tetra-carboxylic acid and substitution products thereof" in the name of Wilhelm Eckert, Heinrich Sieber, Heinrich Greune and Gerhard Langbein.

(5) 10 parts of 1.4.5.8-naphthalene-tetra-carboxylic acid di-para-tolyl-di-imide of the following formula:

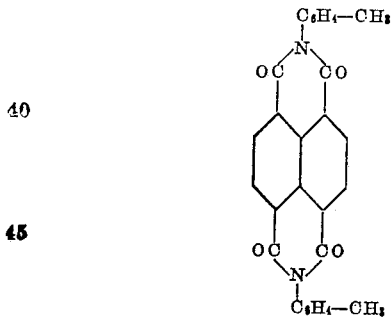

are heated together with 100 parts of sulfuric acid of 66° Bé. for 1 hour to a temperature of from 180° C. to 200° C. The solution is then poured on ice and water and the 1.4.5.8-naphthalene-tetra-carboxylic acid precipitated thereby in the form of its anhydride is filtered by suction, washed with ice water and dried.

(6) 10 parts of 1.4.5.8-naphthalene-tetra-carboxylic acid diethyl di-imide of the following formula:

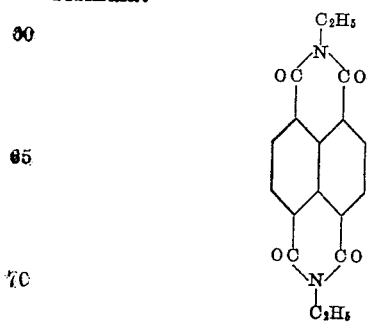

are heated together with 70 parts of concentrated sulfuric acid for about 1 hour up to a temperature of from 170° C. to 190° C. The solution is poured on ice and the 1.4.5.8-naphthalene-tetra-carboxylic acid precipitated thereby in the form of its anhydride is filtered by suction, washed with ice water and dried.

It is to be understood that in the following claims the term "a sulfuric acid of high concentration" comprises also fuming sulfuric acid of different concentrations.

We claim:

1. The process which comprises causing a sulfuric acid of high concentration to act at about 160° C. to about 270° C. upon a 1.4.5.8-naphthalene-tetra-carboxylic acid di-imide.

2. The process which comprises causing a sulfuric acid of high concentration to act at about 160° C. to about 270° C. upon a compound of the following general formula:

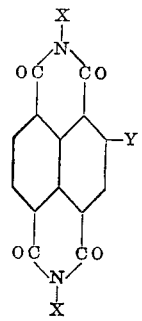

wherein Y stands for hydrogen or halogen and X for hydrogen, alkyl or aryl.

3. The process which comprises causing a sulfuric acid of high concentration to act at about 160° C. to about 270° C. upon a compound of the following general formula:

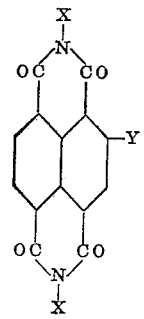

wherein Y stands for hydrogen or chlorine and X for hydrogen, methyl, ethyl, phenyl or p-tolyl.

4. The process which comprises causing concentrated sulfuric acid to act at from 200° C. to 210° C. upon 1.4.5.8-naphthalene-tetra-carboxylic acid di-imide.

5. The process which comprises causing sulfuric acid monohydrate to act at about 200° C. upon 1.4.5.8-naphthalene-tetra-carboxylic acid di-methyl-imide.

6. The process which comprises causing fuming sulfuric acid containing 5 per cent of sulfuric anhydride to act at from about 180° C. to 200° C. upon a 2-chloro-1.4.5.8-naphthalene-tetra-carboxylic acid di-imide.

HEINRICH GREUNE.
WILHELM ECKERT.